United States Patent
Steele et al.

(10) Patent No.: US 11,130,414 B2
(45) Date of Patent: Sep. 28, 2021

(54) UTILITY VEHICLE WITH VEHICLE CONTROL MODULE

(71) Applicant: Club Car, LLC, Evans, GA (US)

(72) Inventors: Todd Steele, Martinez, GA (US); Robert Edwards, Martinez, GA (US); John Robbins, Evans, GA (US); Bruce Tenerowicz, North Augusta, SC (US)

(73) Assignee: CLUB CAR, LLC, Evans, GA (US)

( * ) Notice: Subject to any disclaimer, the term of this patent is extended or adjusted under 35 U.S.C. 154(b) by 15 days.

(21) Appl. No.: 16/695,937

(22) Filed: Nov. 26, 2019

(65) Prior Publication Data

US 2020/0171966 A1 Jun. 4, 2020

Related U.S. Application Data

(60) Provisional application No. 62/773,094, filed on Nov. 29, 2018.

(51) Int. Cl.
| | |
|---|---|
| *B60L 53/22* | (2019.01) |
| *H02J 7/00* | (2006.01) |
| *B60Q 1/04* | (2006.01) |
| *B60L 53/66* | (2019.01) |
| *B60L 1/00* | (2006.01) |
| *B60L 50/64* | (2019.01) |

(52) U.S. Cl.
CPC .............. *B60L 53/22* (2019.02); *B60L 1/00* (2013.01); *B60L 50/64* (2019.02); *B60L 53/66* (2019.02); *B60Q 1/04* (2013.01); *H02J 7/0013* (2013.01); *H02J 7/00032* (2020.01); *B60L 2210/10* (2013.01)

(58) Field of Classification Search
CPC .......... B60L 53/22; B60L 50/64; B60L 53/66; B60L 1/00; B60L 2210/10; H02J 7/00032; H02J 7/001313; H02J 7/00; B60Q 1/04
See application file for complete search history.

(56) References Cited

U.S. PATENT DOCUMENTS

| | | | | |
|---|---|---|---|---|
| 2011/0291475 A1* | 12/2011 | Schaffnit | ................. | B60L 15/20 307/10.1 |
| 2012/0112533 A1* | 5/2012 | Yarmak | ................... | B60L 50/16 307/10.1 |

* cited by examiner

*Primary Examiner* — Robert L Deberadinis
(74) *Attorney, Agent, or Firm* — Edell, Shapiro & Finnan, LLC (57) ABSTRACT

A utility vehicle includes an electric motor constructed to provide motive power to the utility vehicle; a lithium ion battery pack coupled to the electric motor at a first voltage and operative to provide electrical power at the first voltage to the electric motor for driving the utility vehicle, the lithium ion battery pack including a DC/DC converter constructed to output electrical power at a second voltage; and a vehicle control module (VCM) coupled to the DC/DC converter, constructed to operate at the second voltage and constructed to control at least some operations of the utility vehicle.

20 Claims, 11 Drawing Sheets

UTILITY VEHICLE WITH VEHICLE CONTROL MODULE

TECHNICAL FIELD

The present invention generally relates to utility vehicles. More particularly, but not exclusively, the present invention relates to utility vehicles having a vehicle control module.

BACKGROUND

Utility Vehicles remain an area of interest. Some existing systems have various shortcomings, drawbacks and disadvantages relative to certain applications. For example, in some utility vehicle configurations, a vehicle control module may improve utility vehicle performance. Accordingly, there remains a need for further contributions in this area of technology.

BRIEF SUMMARY

One embodiment of the present invention is a unique utility vehicle. Other embodiments include apparatuses, systems, devices, hardware, methods, and combinations for utility vehicles. Further embodiments, forms, features, aspects, benefits, and advantages of the present application shall become apparent from the description and figures provided herewith.

BRIEF DESCRIPTION OF THE DRAWINGS

The description herein makes reference to the accompanying figures wherein like reference numerals refer to like parts throughout the several views.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 1:
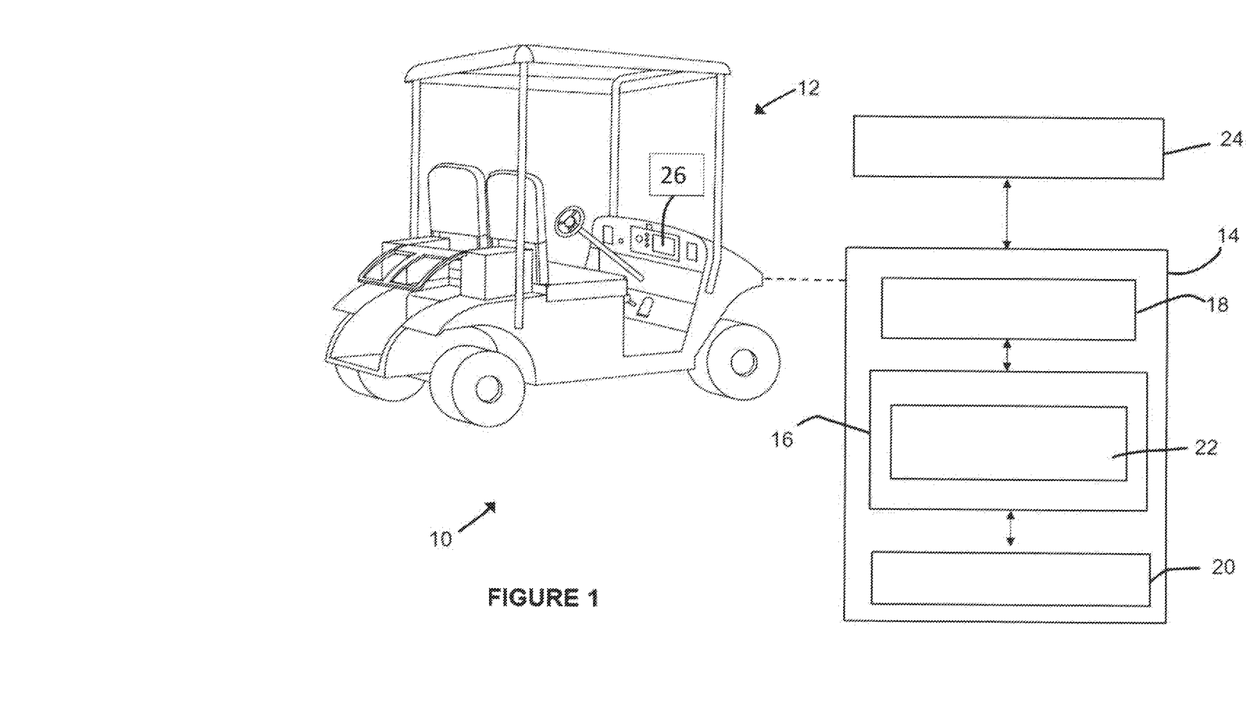
FIG. 1 illustrates a schematic representation of an exemplary vehicle system according to an illustrated embodiment of the subject application.
Figure 2:
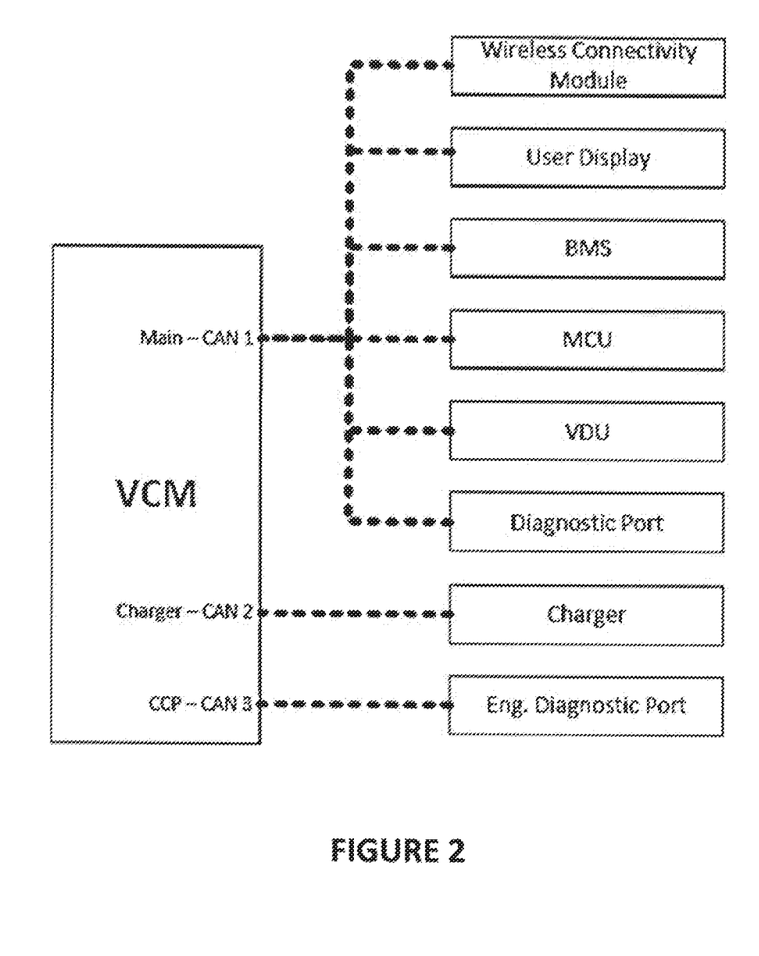
FIG. 2 illustrates a representation of exemplary subsystems of a vehicle control system according to an illustrated embodiment of the subject application.
Figure 3:
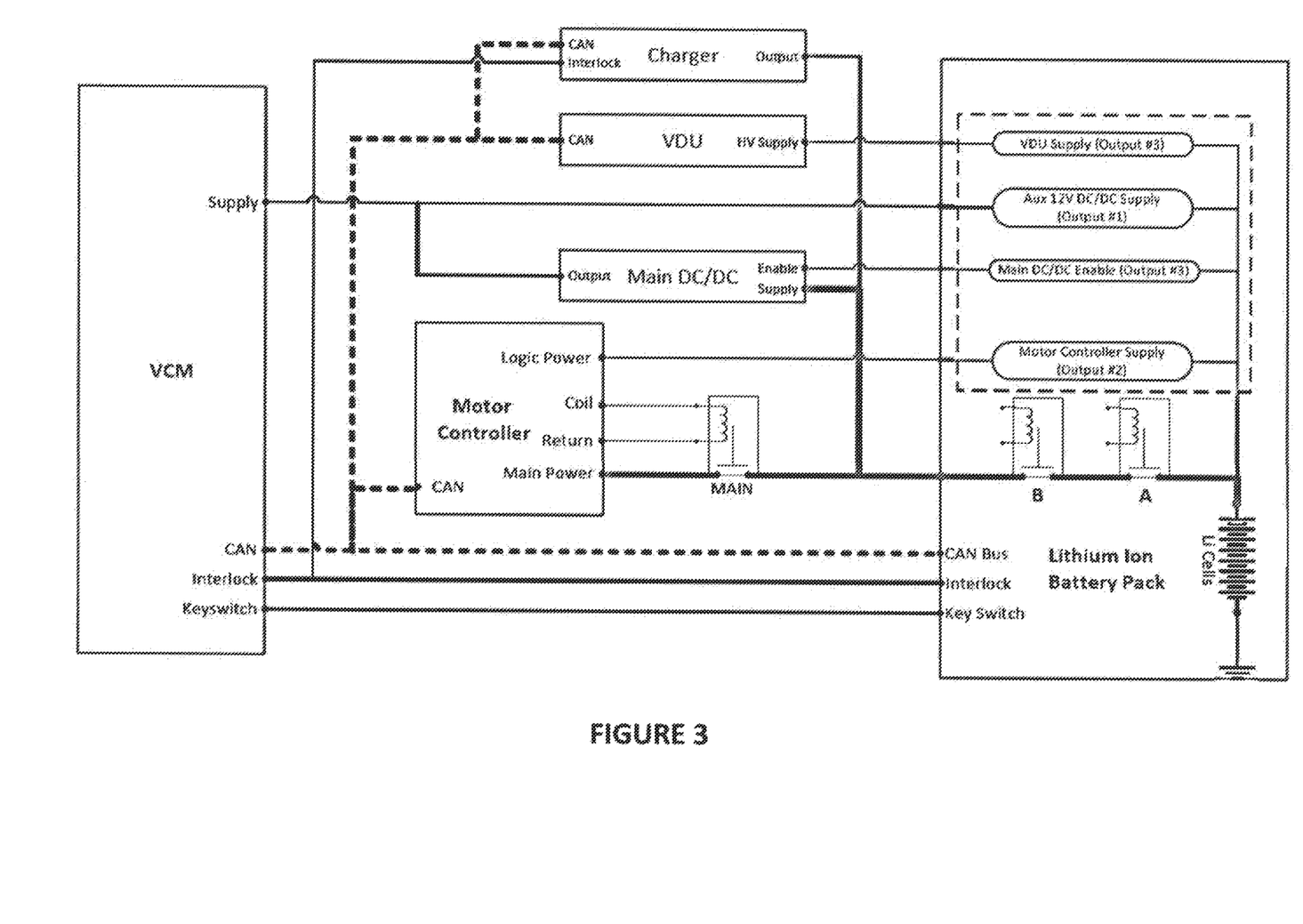
FIGS. 3 and 4 illustrate representations of exemplary architectures for subsystems of vehicle control systems that include an electronic battery control module that is coupled to a lithium ion battery pack.

FIG. 1 illustrates a schematic representation of an exemplary vehicle system 10 according to an illustrated embodiment of the subject application. As illustrated, the exemplary vehicle system 10 can include a utility vehicle 12 having an associated vehicle control system 14. A variety of different types of vehicles can be used as the utility vehicle 12. Further, the utility vehicle 12 can be a motorized vehicle, such as, for example, a vehicle that is motorized or otherwise powered via the use of electrical power, batteries, internal combustion engines, renewal energy sources, and/or combinations thereof, in addition to other manners of motorization. In one particular form, the utility vehicle 12 includes a lithium ion battery pack that is structured to provide electrical power used to power an electric motor of the utility vehicle 12 that constructed to provide a driving force or propulsion or motive power for movement of the utility vehicle 12 and/or which provides electrical power for one or more electrical devices of the utility vehicle 12. Further, the utility vehicle 12 can be adapted for a variety of different types of applications and/or uses. For example, according to certain embodiments, the utility vehicle 12 is a motorized golf car or cart. Alternatively, or additionally, according to other embodiments, the utility vehicle 12 is a fully autonomous vehicle, a relatively small all-terrain utility vehicle, a neighborhood vehicle, or any other similarly classed light utility passenger vehicle. Accordingly, it will be understood that descriptions found herein that mention "utility vehicle" are not to be construed as limited, but rather can be applied more broadly as set forth herein.

The vehicle control system 14, which can be positioned within and/or around the utility vehicle 12, can utilize a variety of different types of hardware and/or software. Additionally, the vehicle control system 14 can be configured to execute a variety of different computer based applications, including, for example, at least those discussed below with respect to FIGS. 2-6. Additionally, according to certain embodiments, the vehicle control system 14 can execute or otherwise rely upon various computer software applications, components, programs, objects, modules, and/or data structures. Moreover, various applications, components, programs, objects, and/or modules, can be executed on one or more processors of the vehicle control system 14, or in another device or web-server network that is coupled to the vehicle control system 14.

According to the exemplary embodiment depicted in FIG. 1, the vehicle control system 14 includes a processing device 16, an input/output device 18, a memory 20, and an operating logic 22. Furthermore, as illustrated, the vehicle control system 14 can communicate with one or more external devices 24 as discussed below. The input/output device 18 can be any type of device that allows the vehicle control system 14 to communicate with the external device 24 and/or to otherwise receive or communicate instructions and/or information. For example, according to certain embodiments, the input/output device 18 can be a network adapter, a network card, or a port (e.g., a USB port, serial port, parallel port, VGA, DVI, HDMI, FireWire, CAT 5, or any other type of port). The input/output device 18 can be comprised of hardware, software, and/or firmware. It is contemplated that the input/output device 18 includes more than one of these adapters, cards, or ports. Additionally, according to certain embodiments, the vehicle control system 14 can include, or otherwise be coupled to, one or more transceivers that are configured for communication with external devices 24, including, for example, via use of one or more wireless protocols or data streams, among other communication protocols.

The external device 24 can be any type of device that allows data to be inputted or outputted from the vehicle control system 14. To set forth just a few non-limiting examples, the external device 24 can be a handheld device, another computer, a server, a printer, a display, an alarm, an illuminated indicator, a keyboard, a mouse, mouse button, or a touch-screen display. Furthermore, it is contemplated that, according to certain embodiments, the external device 24 can be integrated into the vehicle control system 14. For example, the vehicle control system 14 can be a smartphone, a laptop computer, or a tablet computer. Additionally, according to certain embodiments, the display of the external device 24, if any, may or may not be integrated with the vehicle control system 14 as one unit, which can be consistent with the general design of certain external devices 24, such as, for example, smartphones, laptop computers, tablet computers, and the like. It is further contemplated that there can be more than one external device in communication with the vehicle control system 14.

The processing device 16 can be of a programmable type, a dedicated, hardwired state machine, or a combination of these, and can further include multiple processors, Arithmetic-Logic Units (ALUs), Central Processing Units (CPUs), or the like. For forms of processing devices 16 with multiple processing units, distributed, pipelined, and/or parallel processing can be utilized as appropriate. The processing device 16 can be dedicated to performance of just the operations described herein, or can be utilized in one or more additional applications. In the depicted form, the processing device 16 is of a programmable variety that executes algorithms and processes data in accordance with the operating logic 22 as defined by programming instructions (such as software or firmware) stored in the memory 20. Alternatively or additionally, the operating logic 22 for the processing device 16 is at least partially defined by hardwired logic or other hardware. The processing device 16 can be comprised of one or more components of any type suitable to process signals received from the input/output device 18, the external device 24, or elsewhere, as well as provide desired output signals. Such components can include digital circuitry, analog circuitry, or a combination of both.

The memory 20 can be of one or more types, such as a solid-state variety, electromagnetic variety, optical variety, or a combination of these forms. According to certain embodiments, the memory 20 can represent a random access memory (RAM) device, supplemental levels of memory (e.g., cache memories, non-volatile or backup memories (e.g., programmable or flash memories)), read-only memories, or combinations thereof. Further, the memory 20 can be volatile, nonvolatile, or a mixture of these types, and some or all of the memory 20 can be of a portable variety, such as a disk, tape, memory stick, cartridge, or the like. Additionally, the memory 20 can store data that is manipulated by the operating logic 22 of the processing device 16, such as data representative of signals received from and/or sent to the input/output device 18 in addition to or in lieu of storing programming instructions defining the operating logic 22, just to name one example. As shown in FIG. 1, according to certain embodiments, the memory 20 can be included with the processing device 16 and/or coupled to the processing device 16. The memory 20 can store a variety of data, including, for example, at least data related to setting controls of one or more utility vehicles 10, among other data. In addition to the memory 20, the vehicle system 10 can include other memory located elsewhere in the vehicle system 10, such as cache memory in a CPU of an external device 24, as well as any storage capacity used as a virtual memory (e.g., as stored on a storage device or on another computer coupled to the vehicle system 10).

The external device 24 can have one or more similar characteristics of the vehicle control system 14 described above. No limitation is intended to confine the external device 24 to any particular type of device. Data from the external device 24 can be provided to the vehicle control system 14 using any variety of techniques. For example, data can be transmitted over a wired or wireless link, and/or a memory module (e.g. USB stick) can be removed from the external device 24 and connected to a vehicle control system 14. A combination of two or more of the above-mentioned techniques of conveying information from the external device 24 to the vehicle control system 14 are contemplated herein.

According to certain embodiments, the utility vehicle 12 can be configured to communicate information externally over external devices 24 that include one or more networks. The one or more networks can each include, or be in operable communication with, one or more computer networks, such as, for example, a local area network (LAN) including wireless LAN (i.e., Wi-Fi), a wide area network (WAN), a cellular network (e.g., 3G, 4G Long-Term Evolution (LTE), 5G, etc.), and/or the Internet, among other networks that are configured to send and/or receive data.

In the exemplary embodiment illustrated in FIG. 1, the utility vehicle 12 can include, or have operably coupled thereto, a navigation and positioning system (NPS), which can also be referred to as a telematics system and/or a respective telematics system(s). For example, according to certain embodiments, the NPS is a global position system (GPS) device that is mounted external to the utility vehicle 12, and/or an electronic horizon device that is connected to the utility vehicle 12. According to such embodiments, the NPS can be electronically connected to the vehicle control system 14 for the purpose of providing, and/or receiving information, including, for example, geographic location data, among other data. Further, according to certain embodiments, other additional information can be can be transmitted to/from the NPS and the vehicle control system 14. As used herein, the term "telematics" can include the integrated use of communications and information technology to store and receive information from telecommunications devices to remote objects. In some forms telematics can include any one or more of providing navigation and/or positioning information, transmission of navigation and/or positioning information, exchanging information between a central location and the vehicle, manage and monitor vehicle operations, fleet management, geofencing, etc. Communications can be over a cellular network, but other types of data transmission and reception are contemplated.

In the illustrated embodiment of FIG. 1, the vehicle control system 14 can also be connected to a display 26, as such as, for example, a display 26 that is positioned for viewing by a user or operator of the utility vehicle 12. In certain embodiments, the display 26 can be a visual display computer unit (e.g., a monitor, a liquid crystal display (LCD) panel, organic light emitting diode (OLED) display panel, among others) such as a touch screen interactive display, that can display a variety of information, including, for example, information that is updated in real-time regarding the current location of the utility vehicle 12, as well as information pertaining to other utility vehicles.

In various embodiments, vehicle control system 14 of utility vehicle 12, electric or gas, can include several subsystems which may include, but is not limited to, an electronic vehicle control module, a motor controller (e.g., for utility vehicles including an electric motor for propulsion or motive power for utility vehicle 12), an engine control module/unit (ECU) (for utility vehicles also or alternatively having an engine for propulsion or motive power of utility vehicle 12), an electronic battery control module (BCM), which may also be referred to as a battery management system (BMS), a battery charger, a user display, and a wireless connectivity module, which in some embodiments may be or include, for example, a Visage Display Unit (VDU), available from Club Car LLC of Ingersoll-Rand PLC, which may be considered a telematics system or device, which may provide, for example, information about the local environment, e.g., a golf course and individual holes on the golf course, and which may be used in conjunction with the electronic vehicle control module to provide geo-fencing, e.g., to prevent the utility vehicle from being driven on the green, into lakes and the like, and may include the use of GPS. These subsystems communicate utilizing a common communication bus/protocol, which, for example but without limitation, can be an automotive industry standard based (LIN, CAN, FlexRay, etc.) or proprietary network or communication bus/protocol. In some embodiments, the BMS or BCM is a part of the lithium ion battery pack. In some embodiments, the BMS or BCM includes a VDU (Visage Display Unit) power supply, a DC/DC power supply, such as auxiliary 12 V DC/DC power supply, a main DC/DC enable and a motor control power supply.

In the illustrated embodiments, utility vehicle 12 includes an electronic vehicle control module (VCM). In some embodiments, the VCM is an independent electronic module constructed for, and responsible for, supervisory control and monitoring of all vehicle subsystems and electrically operated components. In some embodiments, the VCM may be constructed to perform other actions or control functions. The lithium ion battery pack is coupled to the electric motor at a first voltage, e.g., 28 V or another voltage, and is operative to provide electrical power at the first voltage to the electric motor for driving the utility vehicle. Utility vehicle 12 includes, e.g., as part of the lithium ion battery pack, a DC/DC converter constructed to output electrical power at a second voltage, e.g., lower than the first voltage. For example, in some embodiments, the second voltage is 12 V. The VCM is coupled to the DC/DC converter, and is constructed to receive power from the DC/DC converter and operate at the second voltage, and constructed to control at least some operations of utility vehicle 12.

In one form, the VCM provides closed loop subsystem communication, control, and monitoring of vehicle battery charging. Utility vehicle 12 includes a charger communicatively coupled to the VCM and the lithium ion battery pack, and is constructed to charge the lithium ion battery pack under the control of the VCM.

In an electric utility vehicle, the VCM is constructed to detect the connection of the charger via a hardware discreet input, and then communicates with the charger over a data bus. The VCM turns off power to the motor controller logic board during charging, e.g., to prevent vehicle movement. The VCM is constructed to notify a Battery Control Module over a separate data bus that the vehicle is in charge mode. When in the charging mode, Battery Control Module broadcasts a requested charge current value over the data bus, e.g., based on a predefined Battery Control Module algorithm. The VCM commands the charger on via a data bus to output the requested current value for charging the battery, e.g., the lithium ion battery pack, which in one form includes one or more lithium ion battery cells. The requested charge current value may change at different points or times throughout the charge cycle, e.g., based on one or more parameters. For example, the magnitude of the requested current may be supplied to the VCM or the charger based on at least one of a stored equation and a stored lookup table. The requested current may depend on one or more of a plurality of parameters, and may be limited by, for example, temperature, e.g., battery temperature, how fully charged the battery pack is, limiting current values determined based on a desired battery life or charge cycle life and/or other parameters. As the Battery Control Module charge current values change, the new or changed charge current values are broadcast over the data bus, and the VCM commands the charger to output the new or changed requested charge current value until the VCM determines that the charge is complete.

The VCM is constructed to provide of vehicle power bus pre-charge, e.g., precharging of a capacitor back, which may, for example, be disposed in or considered part of the motor controller. The VCM is constructed to precharge the capacitor bank, e.g., prior to the utility vehicle being driven or prior to the electric motor being operated. The VCM is constructed to provide sequencing of all vehicle/battery power contactors to detect and prevent welding of vehicle/battery power bus contactors through data bus communication with vehicle subsystem components, including but not limited to, the motor controller and the battery control module. In some embodiments, the sequencing is performed after the initiation of precharging. For example, in some embodiments, the lithium ion battery pack is used to precharge the motor controller capacitor bank. After precharging is initiated, the contactors are checked to see if they are unintentionally closed, e.g., welded closed. For example, with respect to FIG. 4, the main contactor is checked by subtracting Vout of the lithium ion battery pack from Vcap of the capacitor bank. If the delta, or difference, is greater than a threshold, e.g., a predetermined threshold, the contactor is not welded closed. If the delta is not greater than the threshold, the weld check has failed, which means that the main contactor is welded.

Figure 4:
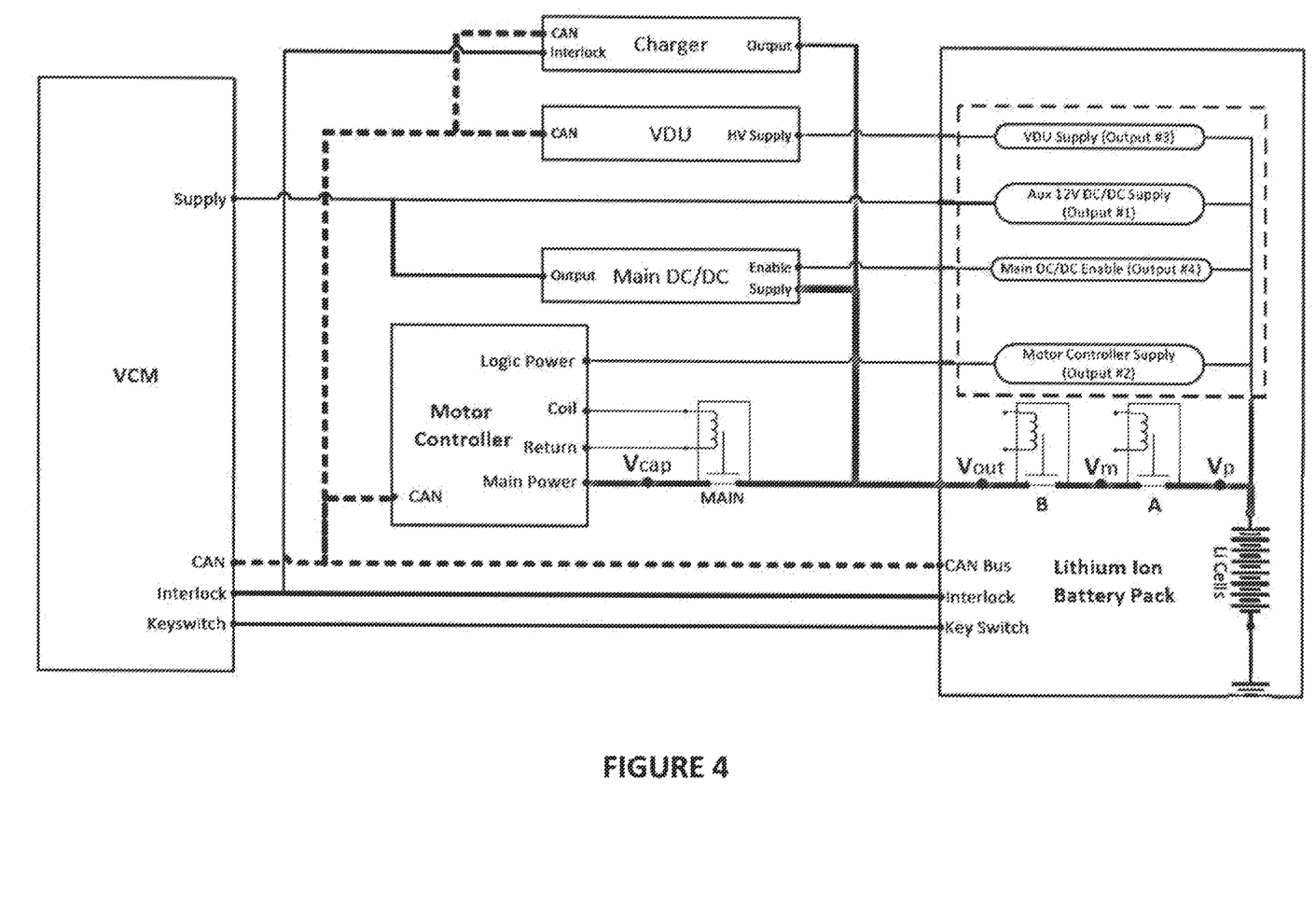
Figure 5:
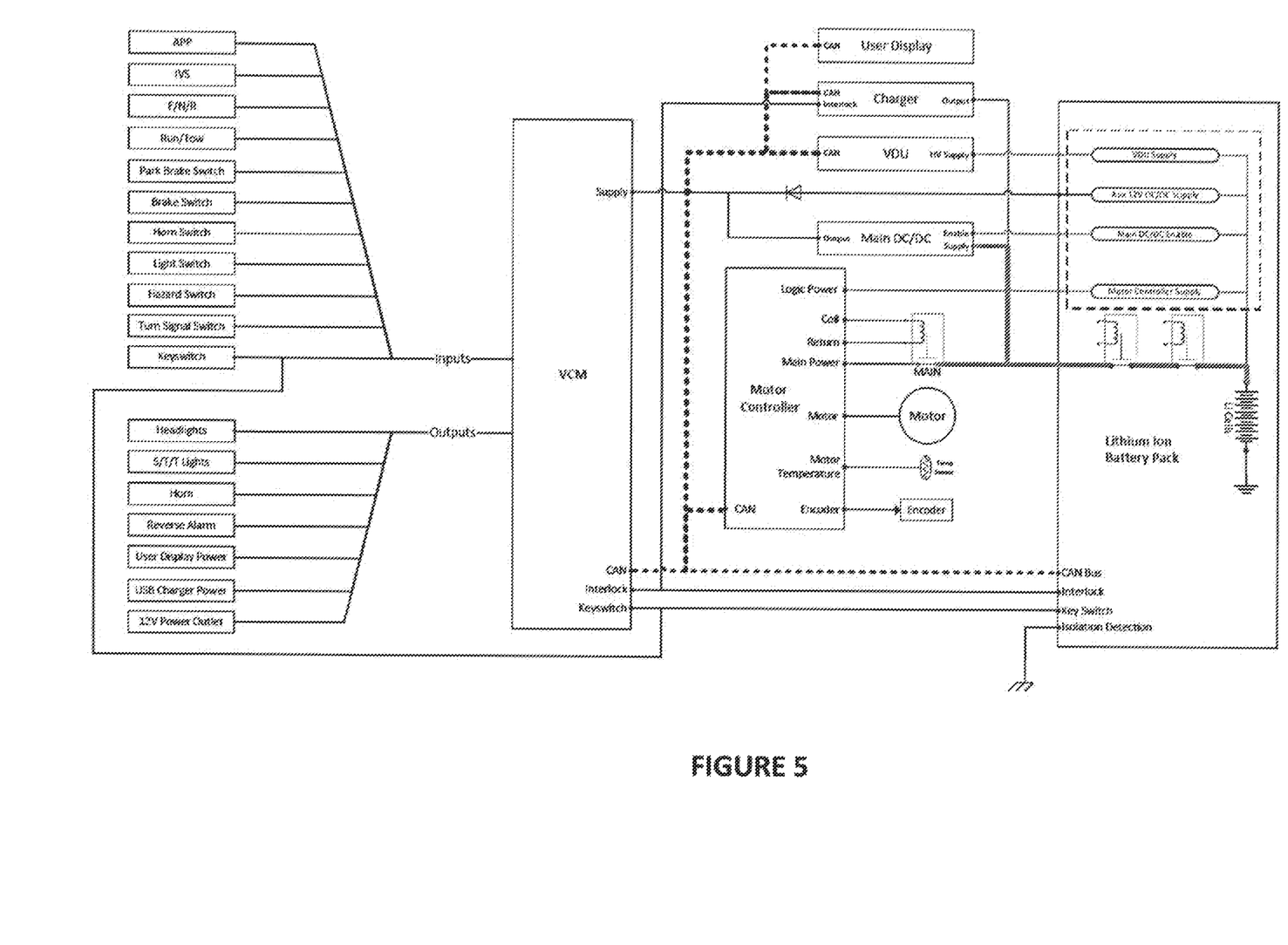
FIG. 5 illustrates a representation of an exemplary lithium/AC vehicle control system architecture that includes an electronic battery control module that is coupled to a lithium ion battery pack, and in which a vehicle control module outputs signals for a plurality of DC powered loads.
Figure 6:
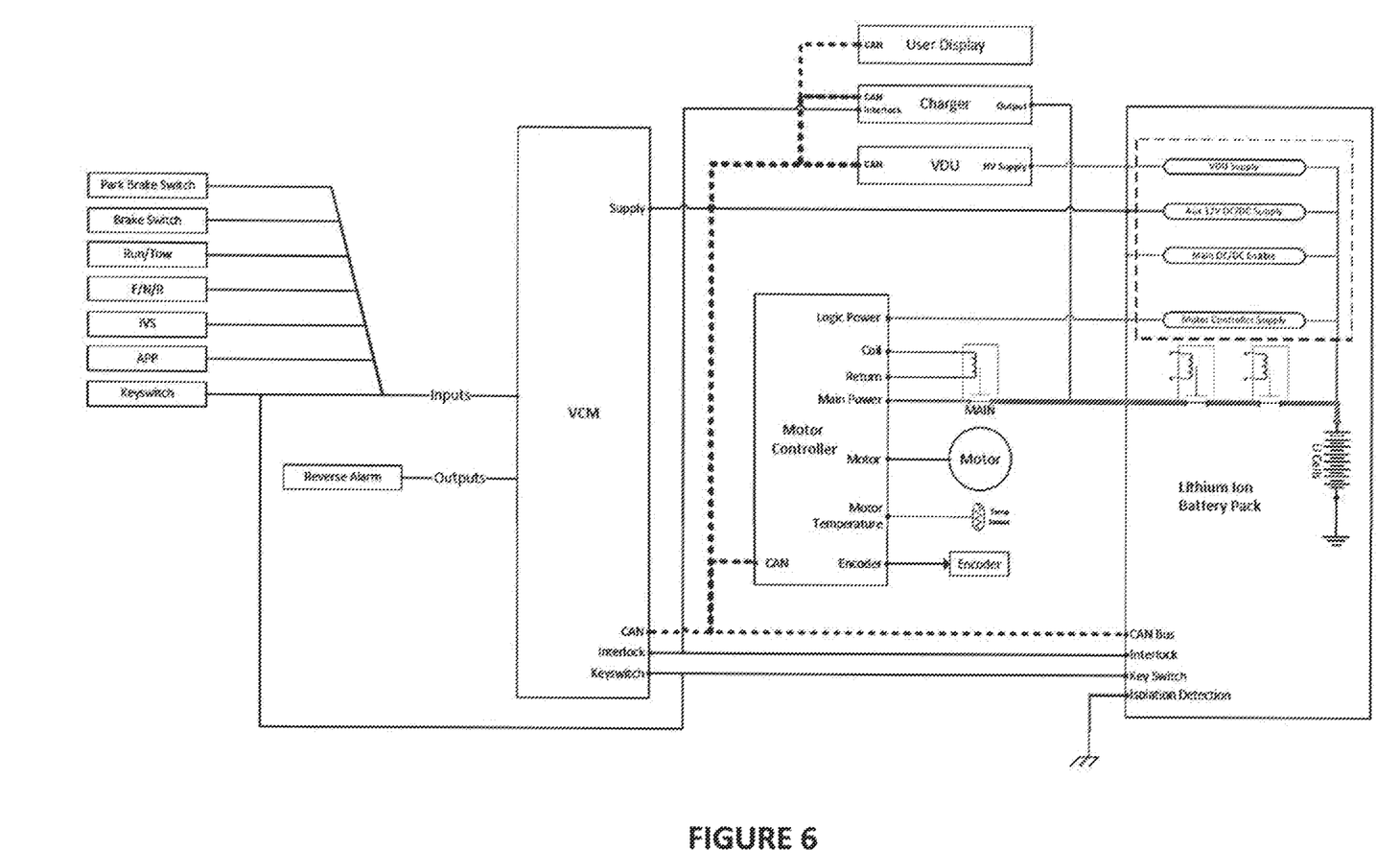
FIG. 6 illustrates a representation of an exemplary lithium/AC vehicle control system architecture that includes an electronic battery control module that is coupled to a lithium ion battery pack, and in which a user display receives power via an auxiliary DC/DC converter.
Figure 7:
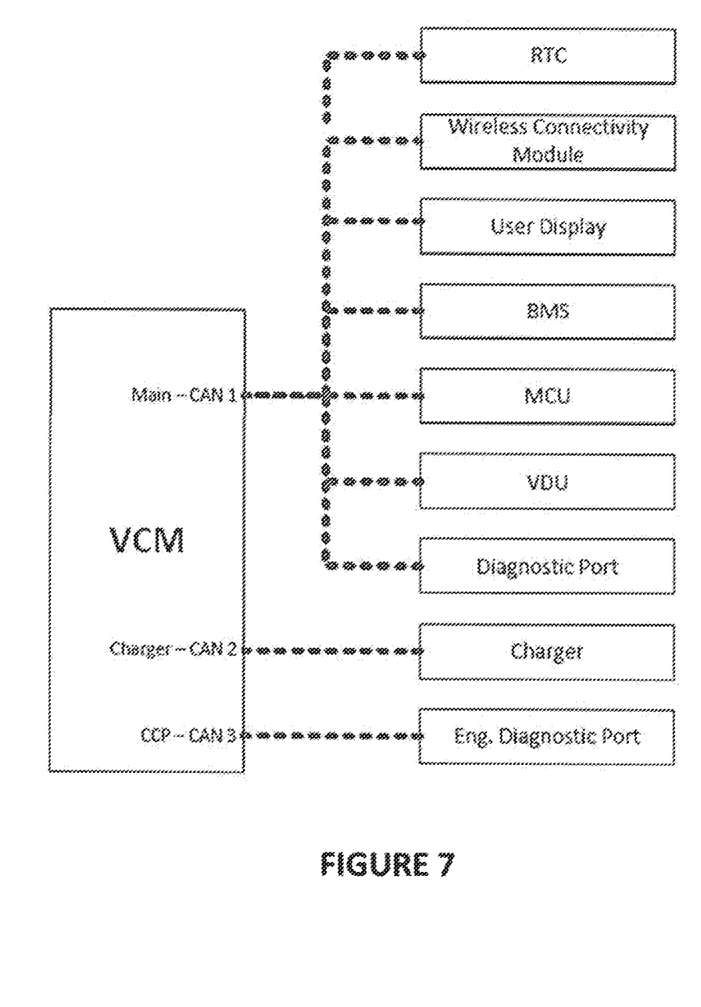
FIG. 7 illustrates a representation of exemplary subsystems of a vehicle control system according to an illustrated embodiment of the subject application.
Figure 8:
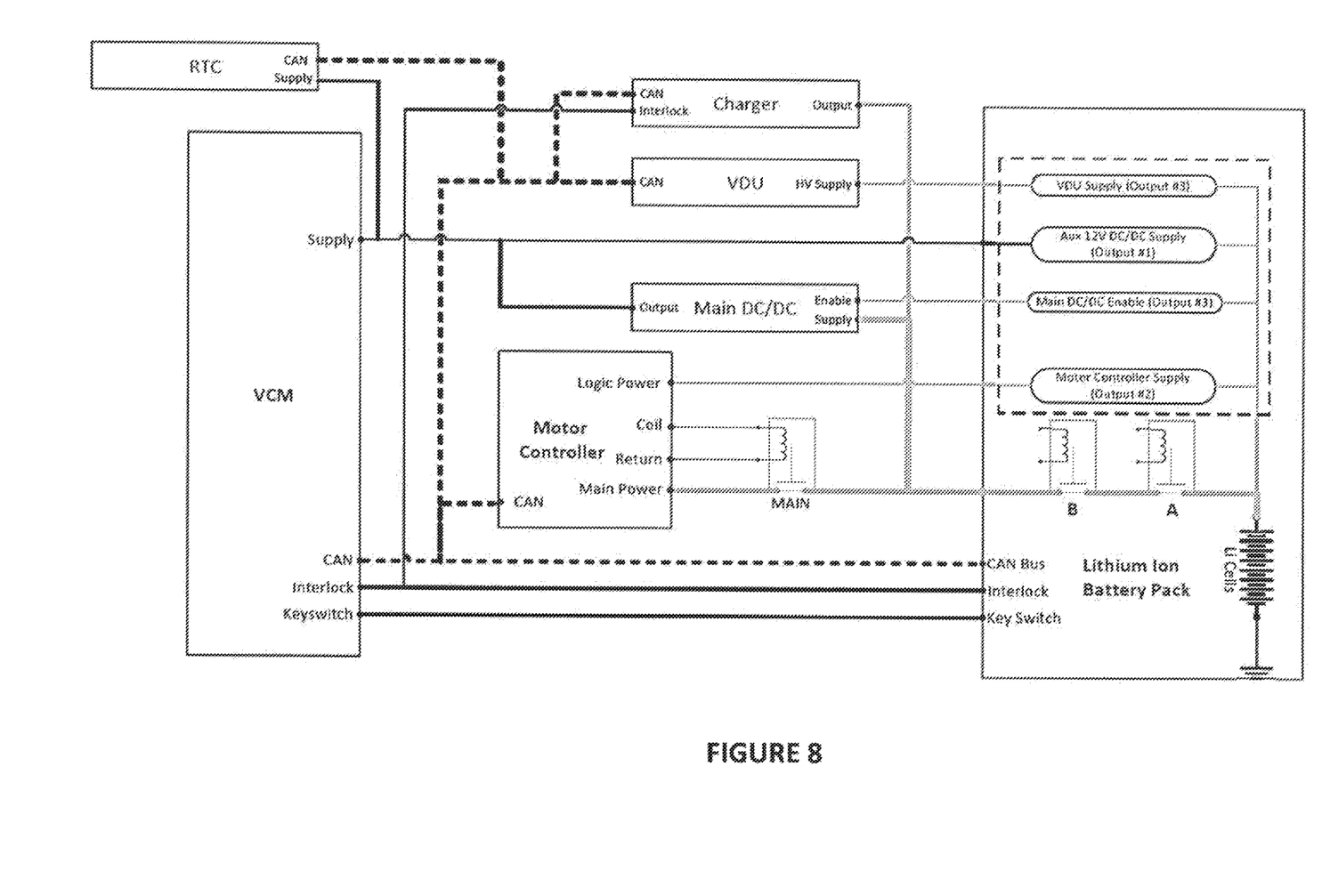
FIGS. 8 and 9 illustrate representations of exemplary architectures for subsystems of vehicle control systems that include an electronic battery control module that is coupled to a lithium ion battery pack.
Figure 9:
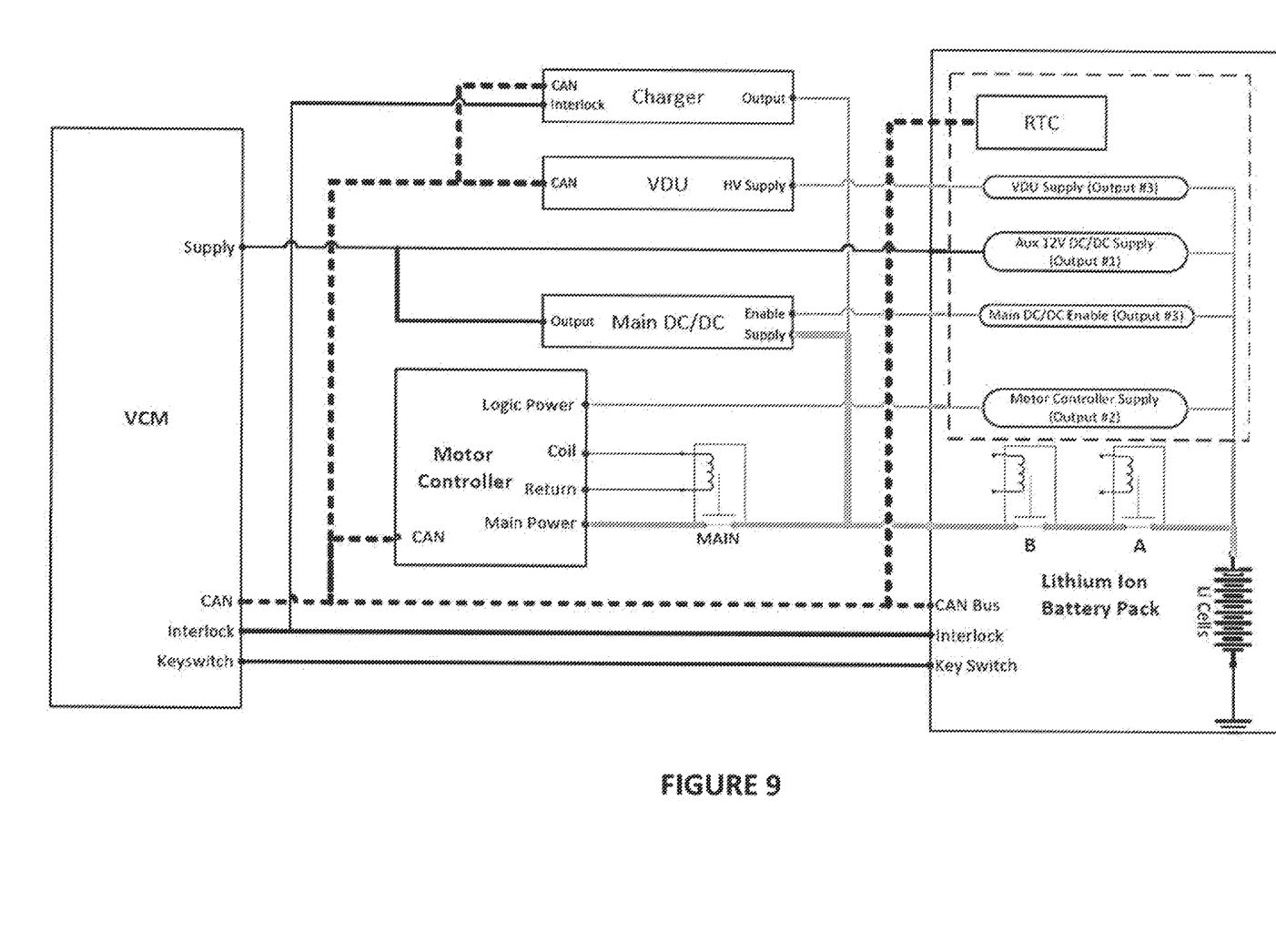
Figure 10:
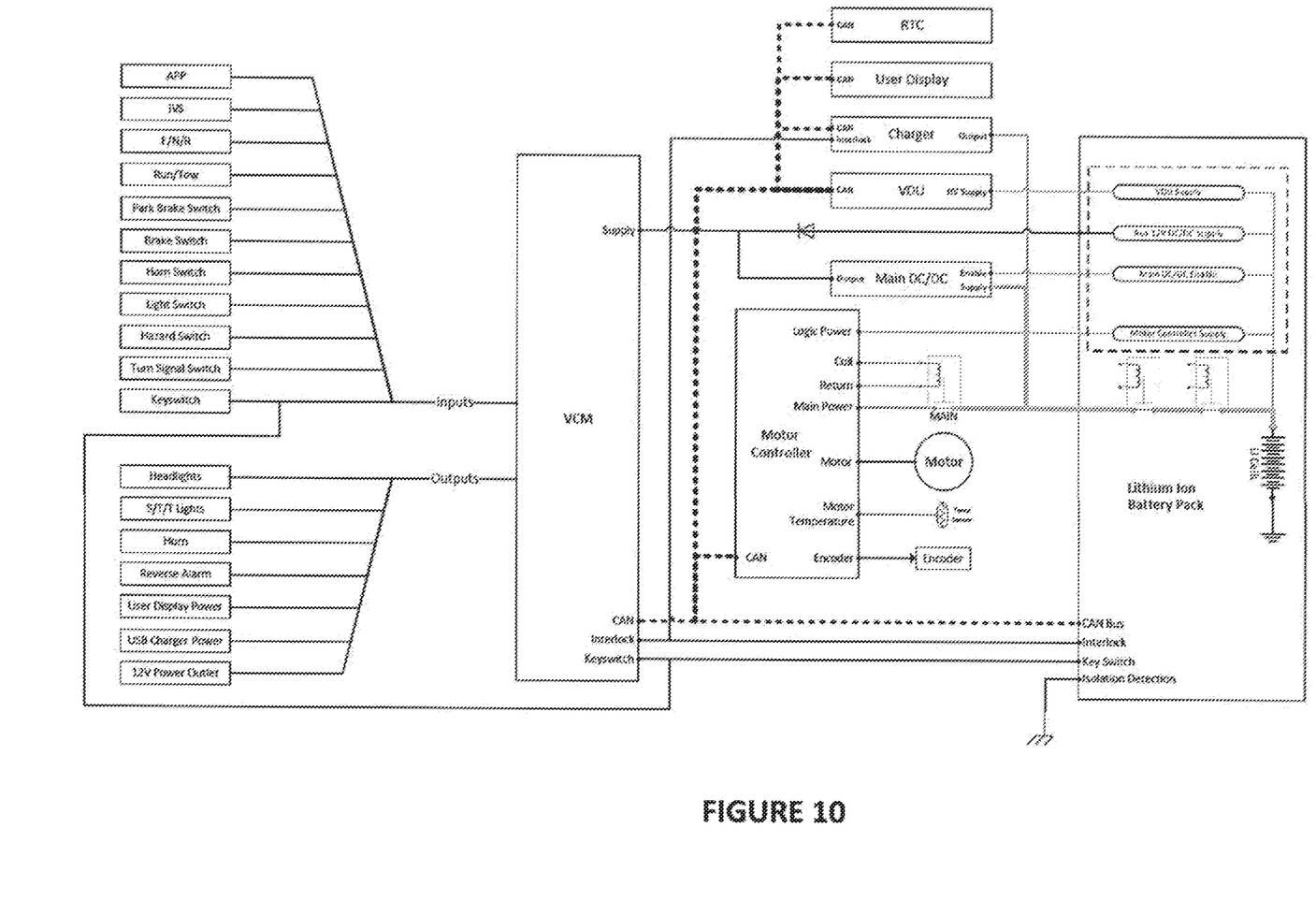
FIG. 10 illustrates a representation of an exemplary lithium/AC vehicle control system architecture that includes an electronic battery control module that is coupled to a lithium ion battery pack, and in which a vehicle control module outputs signals for a plurality of DC powered loads.
Figure 11:
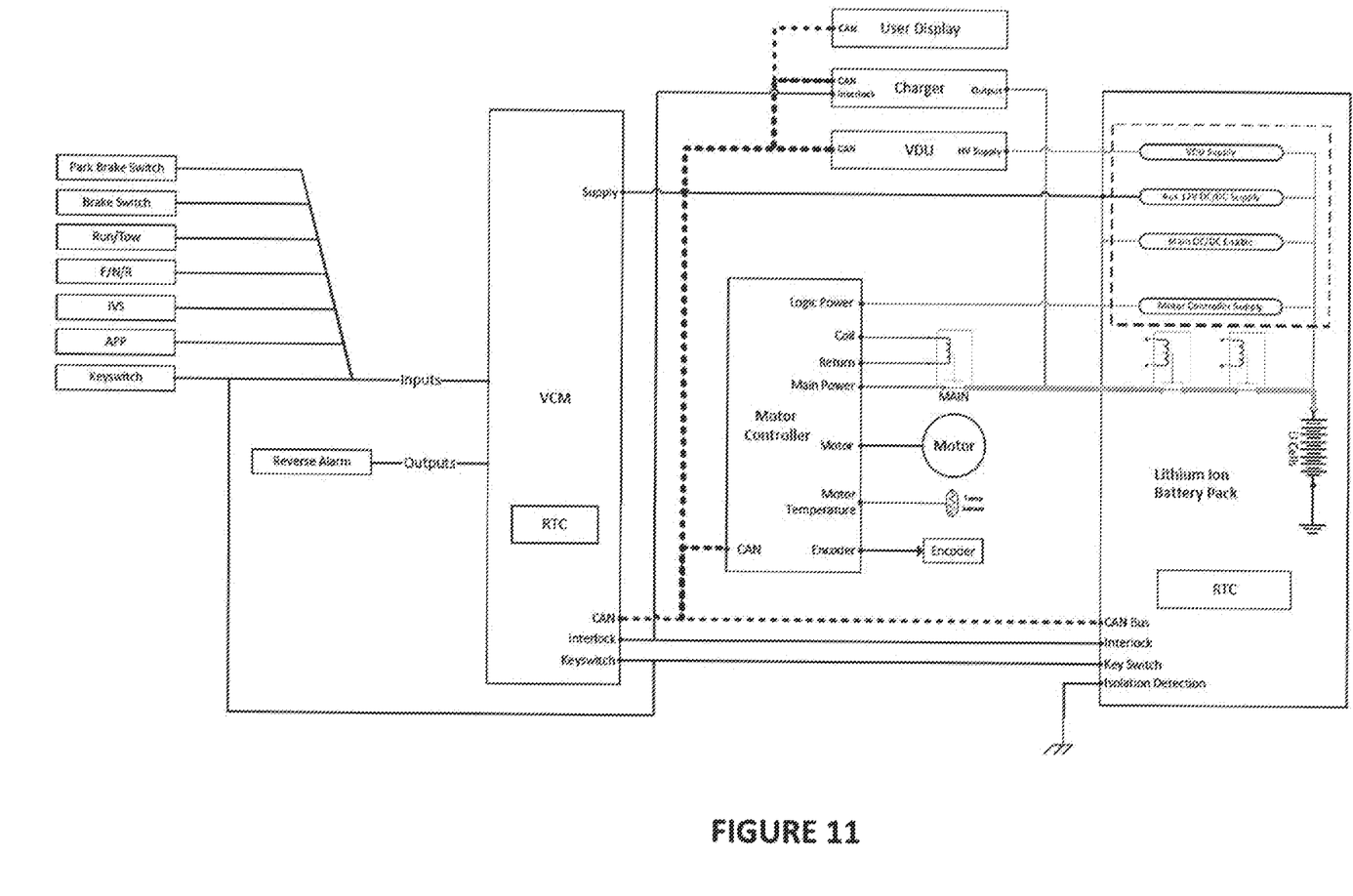
FIG. 11 illustrates a representation of an exemplary lithium/AC vehicle control system architecture that includes an electronic battery control module that is coupled to a lithium ion battery pack, and in which a user display receives power via an auxiliary DC/DC converter.

The contactor B is then checked by subtracting Vm from Vcap. If the delta, or difference, is greater than a threshold, e.g., a predetermined threshold, the contactor is not welded closed. If the delta is not greater than the threshold, the weld check has failed, which means that contactor B is welded.

In the illustrated embodiment, three contactors are employed—a main contactor, and contactors A and B, which in some embodiments are part of the lithium ion battery pack. In other embodiments, more, less or different contactors may be employed. For example, some embodiments may only have a main contactor, or may only have one or both of contactors A and B, whereas other embodiments may have a main contactor and only one of contactors A and B.

The VCM is constructed to provide one or more outputs, e.g., one or more discreet outputs (e.g., on or off), analog outputs (e.g., variable voltage and/or current outputs), and data bus control (e.g., digital output) of vehicle accessories, e.g., all vehicle accessories, including but not limited to headlights, tail lights, brake lights, horn, daytime running lights, and relay control of customer-added accessories, each of which is supplied with power at the second voltage, e.g., 12 V, for example, by the VCM. The outputs from the VCM can be used to control (either directly or indirectly through other subsystems such as the BCM and MCU) alternative and/or additional components such as, but not limited to, the contactors A, B, and Main discussed above. In some operations the VCM can output command to control the contactors and converters, for example, to disable the main DC/DC converter when main power output is disconnected, or weld checks are being accomplished. The VCM can alternatively and/or additionally output command to turn on the main DC/DC converter to discharge the HV capacitor bus in the MCU after pack main power output has been disconnected via the contactors. In some forms the VCM can monitor wheel speed via an encoder operated by the MCU, and if motion is detected when main power is off the VCM can output command to control all contactors to the closed position to operate the MCU in a regenerative braking mode. Any control mode of the VCM can occur either through direct I/O (separate and dedicated discrete or analog signals) or through the onboard network communications bus.

In some embodiments, the VCM may be constructed, e.g., via hardware, firmware or software configuration to provide unique lighting operation. For example, daytime running lights may be turned on by the VCM when the vehicle is moving forward or backward, and may be turned off when the vehicle stops, which may reduce power consumption of some vehicle applications. As another example, the VCM may also or alternatively be constructed to control the headlights to perform an alternating wig wag headlight operation.

In some embodiments, utility vehicle 12 includes one or more memories constructed to store utility vehicle configuration information. The one or more memories are accessible by the VCM, and in some embodiments are part of the VCM. Examples of configuration information include top speed, headlight operation, the operation of one or more of a plurality of utility vehicle components, and/or accessories of other factory settings. For example, utility vehicle 12 may include a nonvolatile memory storing initial factory configuration settings or programming. The nonvolatile memory may be a permanent nonvolatile memory, for example, a one-time programmable memory, such as a PROM, or may be an EPROM or EEPROM, or may be another type of nonvolatile memory. Utility vehicle 12 may also include an active configuration memory. Upon initial configuration programming of the vehicle at the factory, the vehicle configuration and settings are stored in the permanent non-volatile memory area, and in some embodiments also in the active configuration memory or memory area. In some embodiments, the active configuration memory also stores customer configuration settings, e.g., configuration settings changed or added by the customer of electric utility vehicle 12. The permanent nonvolatile memory provides a permanent record as to the configuration and settings of utility vehicle 12 when it left the factory, including, for example, tire size (which may, for example, affect top speed).

In some embodiments, the VCM is constructed to provide supervisory processing and implementation of multilevel fault management/storage, enabling independent control of all vehicle subsystems tailored to optimize vehicle response and ensure safe vehicle operation. VCM controlled fault vehicle response can include, but is not limited to, complete vehicle shutdown, vehicle top speed reduction, and/or user information/warning (both visual and/or audible).

The VCM is constructed to provide multiple vehicle operating modes, and timeouts to conserve energy, enhance safety, and optimize battery life. Operating modes may include, for example and without limitation, a standby mode, an active mode, e.g., during which driving of utility vehicle 12 may be performed, a charging mode, a tow and/or stow mode, and a low power mode. In some embodiments, the VCM control of data bus commanded Battery Control Module power supplies and main contactors is based on vehicle operating mode.

In some embodiments, the VCM is constructed to perform authentication of connected vehicle system data bus components through a seed-key algorithm. For example, the VCM may be constructed to authenticate vehicle system data bus components via the network (e.g., CAN or other network or communication bus/protocol)

In some embodiments, the VCM is constructed to provide supervisory control and coordination of vehicle component software updates from multiple sources using multiple protocols, including but not limited to, a data bus connected Wireless Connectivity Module, a data bus connected Diagnostic Tool, and/or a data bus connected computer or controller.

In some embodiments, the VCM is constructed to perform supervisory control of vehicle top speed and allowable direction, e.g., based upon received commands from a wireless connectivity module, GPS, geofence data, and/or one or more other devices and/or data sources.

In some embodiments, the VCM is constructed to provide control and data bus transmission of some or all vehicle status display information.

One aspect of the present application includes a utility vehicle, comprising: an electric motor constructed to provide motive power to the utility vehicle, a lithium ion battery pack coupled to the electric motor at a first voltage and operative to provide electrical power at the first voltage to the electric motor for driving the utility vehicle, the lithium ion battery pack including a DC/DC converter constructed to output electrical power at a second voltage, and a vehicle control module (VCM) coupled to the DC/DC converter, constructed to operate at the second voltage and constructed to control at least some operations of the utility vehicle.

A feature of the present application includes wherein the second voltage is lower than the first voltage.

Another feature of the present application further includes a charger communicatively coupled to the VCM and the lithium ion battery pack, and constructed to charge the lithium ion battery pack under the control of the VCM.

Another feature of the present application includes wherein the VCM is constructed to command the charger to provide a requested current to the lithium ion battery for charging the lithium ion battery.

Another feature of the present application includes wherein the requested current varies in magnitude response to at least one parameter.

Another feature of the present application includes wherein the magnitude of the requested current is supplied to the VCM or the charger based on at least one of a stored equations and a stored lookup table.

Another feature of the present application further includes a capacitor bank, wherein the VCM is constructed to precharge the capacitor bank prior to the utility vehicle being driven.

Another feature of the present application includes wherein the lithium ion battery pack includes a lithium ion battery cell, further comprising a motor controller coupled to the electric motor, and contactor constructed to control electrical flow from the lithium ion battery cell to the motor controller, wherein the VCM is constructed to perform a test to determine whether the contactor in a closed position.

Another feature of the present application includes wherein the VCM is constructed to perform a test to determine whether the contactor is welded in a closed position.

Another feature of the present application includes wherein the utility vehicle includes at least one accessory that operates at the second voltage, and wherein the VCM is constructed to control the at least one accessory.

Another feature of the present application includes wherein the VCM is constructed to supply at least one of a discrete output, an analog output and a data bus signal to control the at least one accessory.

Another feature of the present application includes wherein the VCM is constructed to supply power at the second voltage to the at least one accessory.

Another feature of the present application further includes daytime running lights, wherein the VCM is constructed to turn on the daytime running lights when the utility vehicle is moving and to turn off the daytime running lights when the utility vehicle is stops.

Another feature of the present application further includes daytime running lights, wherein the VCM is constructed to turn on the daytime running lights when the utility vehicle is moving forward or backward.

Another feature of the present application includes further includes headlights, wherein the VCM is constructed to control the headlights to perform an alternating wig wag headlight operation.

Another feature of the present application includes further includes a nonvolatile memory storing initial factory configuration settings.

Another feature of the present application includes wherein the nonvolatile memory is a one-time programmable memory.

Another feature of the present application includes further includes an active configuration memory storing at least one of initial factory configuration settings and customer-selected configuration settings.

Another feature of the present application includes wherein the VCM is constructed to provide supervisory processing and/or implementation of multilevel fault management/storage enabling independent control of all vehicle subsystems and/or accessories.

Another feature of the present application includes wherein the VCM is constructed to optimize vehicle response and/or ensure safe vehicle operation.

Another feature of the present application includes wherein the VCM is constructed to provide a fault vehicle response, the fault vehicle response including complete vehicle shutdown, vehicle top speed reduction and/or user information/warning.

Another feature of the present application includes wherein the VCM is constructed to provide a plurality of vehicle operating modes selected to conserve energy, enhance safety and/or optimize battery life.

Another feature of the present application includes wherein the VCM is constructed to provide the utility vehicle with one or more of a plurality of operating modes, the plurality of operating modes including at least one of a standby mode, an active mode, a charge mode, a tow mode, a stow mode and/or a low power mode.

Another feature of the present application further includes an auxiliary output, wherein the VCM is constructed to control the auxiliary output.

Another feature of the present application further includes a data bus and a battery control module, wherein the VCM is constructed to control a data bus commanded battery control module power supplies and/or a main contactor based on vehicle operating mode.

Another feature of the present application further includes vehicle system data bus components and a network, wherein the vehicle system data bus components are coupled to the VCM via the network, wherein the VCM is constructed to authenticate the vehicle system data bus components via the network.

Another feature of the present application includes wherein the VCM is constructed to authenticate the vehicle system data bus components via the network using a seed-key algorithm.

Another feature of the present application includes wherein the VCM is constructed to receive supervisory control and coordination of vehicle component software updates from multiple source, the multiple sources including at least one of a data bus connected wireless connectivity module, a data bus connected diagnostic tool, and a data bus connected computer.

Another feature of the present application further includes a wireless connectivity module constructed to provide wireless connectivity, wherein the VCM is constructed to provide supervisory control of vehicle top speed and allowable direction based upon commands received from the wireless connectivity module.

Another feature of the present application includes wherein the VCM is constructed to provide control and data bus transmission of vehicle status display information.

Another feature of the present application includes wherein the VCM is constructed to provide control and data bus transmission of all vehicle status display information.

Another aspect of the present application includes a utility vehicle, comprising an electric motor constructed to provide motive power to the utility vehicle, a battery pack coupled to the electric motor at a first voltage through a main power outlet, the ion battery pack operative to provide electrical power at the first voltage to the electric motor for driving the utility vehicle, the ion battery pack including a DC/DC converter constructed to output electrical power through an auxiliary output at a second voltage lower than the first voltage, and a vehicle control module (VCM) coupled to the DC/DC converter, constructed to operate at the second voltage and constructed to control a component of the utility vehicle.

One feature of the present application includes wherein the battery pack is a lithium ion battery pack, further including a charger communicatively coupled to the VCM and the lithium ion battery pack, and constructed to charge the lithium ion battery pack under the control of the VCM, wherein the VCM is constructed to command the charger to provide a requested current to the lithium ion battery for charging the lithium ion battery, and wherein a magnitude of the requested current is supplied to the VCM or the charger based on at least one of a stored equations and a stored lookup table.

Another feature of the present application further includes a motor control unit (MCU) structured to regulate the electric motor, wherein the battery pack includes a battery contactor structured to selectively open and close a circuit pathway to the main power outlet, a motor contactor disposed outside of the battery pack and controllable between a closed state and an open state by the motor control unit, the motor contactor structured to control electrical flow from the battery cell to the motor controller, wherein the VCM is constructed to perform a test on the contactors including the battery contactor and the motor contactor to determine whether the contactors are in a welded condition.

Another feature of the present application includes wherein the MCU includes a capacitor bank, and wherein the VCM is constructed to issue a command useful to connect the MCU to the battery pack via a second auxiliary output, the second auxiliary output structured to provide a precharge voltage higher than the second voltage useful to precharge the capacitor bank prior to the utility vehicle being driven.

Another feature of the present application includes wherein the utility vehicle includes at least one accessory that operates at the second voltage, wherein the VCM is constructed to control the at least one accessory, wherein the VCM is constructed to supply power at the second voltage to the at least one accessory, and wherein the VCM is constructed to supply at least one of a discrete output, an analog output and a data bus signal to control the at least one accessory.

Another feature of the present application includes wherein the at least one accessory is a pair of headlights, wherein the VCM is constructed to control the headlights to perform an alternating wig wag headlight operation.

Another feature of the present application includes wherein the VCM is constructed to provide supervisory processing and/or implementation of multilevel fault management/storage enabling independent control of all vehicle subsystems and/or accessories, wherein the VCM is constructed to provide a fault vehicle response, the fault vehicle response including complete vehicle shutdown, vehicle top speed reduction and/or user information/warning, and wherein the VCM is constructed to provide the utility vehicle with one or more of a plurality of operating modes, the plurality of operating modes including at least one of a standby mode, an active mode, a charge mode, a tow mode, a stow mode and/or a low power mode.

Another feature of the present application further includes vehicle system data bus components and a network, wherein the vehicle system data bus components are coupled to the VCM via the network, wherein the VCM is constructed to authenticate the vehicle system data bus components via the network, and wherein the VCM is constructed to authenticate the vehicle system data bus components via the network using a seed-key algorithm.

Another feature of the present application includes wherein the VCM is constructed to provide supervisory control and coordination of vehicle component software updates from at least one source, the vehicle component software updates including an update to at least one of the BMS, MCU, and a display control unit, the multiple sources including at least one of a data bus connected wireless connectivity module, a data bus connected diagnostic tool, and a data bus connected computer.

Another feature of the present application further includes a wireless connectivity module constructed to provide wireless connectivity, wherein the VCM is constructed to provide supervisory control of vehicle top speed and allowable direction based upon commands received from the wireless connectivity module, wherein the VCM is constructed to provide control and data bus transmission of vehicle status display information, and wherein the VCM is constructed to provide control and data bus transmission of all vehicle status display information.

Yet another aspect of the present application includes an apparatus comprising a utility vehicle having wheels for rolling transportation, the utility vehicle including: an electric motor and electric motor control unit (MCU) structured to provide motive power to at least one of the wheels; a battery pack coupled with a battery management system (BMS) structured to provide electric power at a first voltage through a main power output to the electric motor for motive transportation, the battery pack including an auxiliary power output structured to provide an output power at a second voltage lower than the first voltage, and a vehicle control module (VCM) coupled to the auxiliary power output and constructed to communicate with the MCU and the BMS, the VCM structured to provide supervisory control of the utility vehicle.

A feature of the present application includes wherein the VCM communicates with the MCU and the BMS over a network connection, wherein the BMS includes an internal DC/DC step down converter used to provide power to the auxiliary power output, wherein the utility vehicle further includes a main DC/DC converter which is structured to be enabled by a signal from a second auxiliary power output from the BMS, and wherein operation of the main DC/DC converter is controlled by the VCM.

Another feature of the present application includes further includes a charger structured to provide power to the battery pack for charging, wherein the VCM communicates with the BMS and the MCU over a first communications bus, and wherein the VCM communicates with the charger over a second communications bus.

Another feature of the present application includes wherein the VCM disables the main DC/DC converter when main power from the battery pack is commanded to the OFF condition, wherein the MCU includes a capacitor bank, wherein the BMS includes a third auxiliary power output structured to provide power at a voltage higher than the second voltage, wherein the capacitor bank of the MCU is structured to receive a pre-charge via power delivered from the third auxiliary power output, and wherein the VCM is structured to control delivery of power from the third auxiliary power output to the MCU.

Another feature of the present application further includes at least one battery contactor structured to regulate power provided from the battery pack through the main power output, wherein the MCU is structured to control a main contactor which is in serial electrical communication with the battery contactor when both the battery contactor and the main contactor are closed and the battery pack provides power through the main power output.

Another feature of the present application includes wherein the VCM is structured to issue at least one command over a communication bus to actuate the main contactor and the battery contactor, and wherein the VCM is structured to initiate a weld check of the contactors includes at least one of the main contactor and battery contactor.

Another feature of the present application further includes a main DC/DC converter in electrical communication with the BMS via a second auxiliary power output, wherein the VCM is structured to disable the main DC/DC converter via the second auxiliary power output during the weld check.

Another feature of the present application includes wherein the MCU includes a capacitor bank, and wherein the VCM is structured to enable the DC/DC converter when main power at the main power output is OFF so that power can be dissipated from the capacitor bank.

Another feature of the present application further includes a wheel sensor structured to detect motion of at least one wheel of wheels, wherein the BMS further includes a second auxiliary power output structured to provide power to the MCU apart from a main power, wherein the VCM is structured to monitor the wheel sensor when main power through the main power output is OFF, wherein the battery includes a battery contactor structured to move between an open and closed state to regulate power through the main power output of the battery pack, which further includes a main contactor structured to receive power from the main power output and provide power to the MCU, and wherein the VCM is structured to close the battery contactor and main contactor if main power through the main power output is OFF and motion is detected by the wheel sensor.

Another feature of the present application further includes a third auxiliary power output structured to provide power at a voltage level higher than the second voltage level and electrically connected to a display unit, and which further includes a fourth auxiliary power output structured to provide power at a voltage level higher than the second voltage level and electrically connected to a main DC/DC converter, wherein the main DC/DC converter is further electrically connected to the main power output.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A utility vehicle, comprising:
   an electric motor constructed to provide motive power to the utility vehicle;
   a battery pack coupled to the electric motor at a first voltage through a main power outlet, the battery pack operative to provide electrical power at the first voltage to the electric motor for driving the utility vehicle, the battery pack including a DC/DC converter constructed to output electrical power through an auxiliary output at a second voltage lower than the first voltage; and
   a vehicle control module (VCM) coupled to the DC/DC converter, constructed to operate at the second voltage, constructed to communicate with the electric motor and the battery pack, and constructed to control a component of the utility vehicle.

2. The utility vehicle of claim 1, wherein the battery pack is a lithium ion battery pack, further including a charger communicatively coupled to the VCM and the lithium ion battery pack, and constructed to charge the lithium ion battery pack under the control of the VCM, wherein the VCM is constructed to command the charger to provide a requested current to the lithium ion battery pack for charging the lithium ion battery pack, and wherein a magnitude of the requested current is supplied to the VCM or the charger based on at least one of a stored equations and a stored lookup table.

3. The utility vehicle of claim 1, which further includes a motor control unit (MCU) structured to regulate the electric motor, wherein the battery pack includes a battery contactor structured to selectively open and close a circuit pathway to the main power outlet, a motor contactor disposed outside of the battery pack and controllable between a closed state and an open state by the motor control unit, the motor contactor structured to control electrical flow from a battery cell of the battery pack to the motor controller control unit, wherein the VCM is constructed to perform a test on contactors including the battery contactor and the motor contactor to determine whether the contactors are in a welded condition.

4. The utility vehicle of claim 3, wherein the MCU includes a capacitor bank, and wherein the VCM is constructed to issue a command useful to connect the MCU to the battery pack via a second auxiliary output, the second auxiliary output structured to provide a precharge voltage higher than the second voltage useful to precharge the capacitor bank prior to the utility vehicle being driven.

5. The utility vehicle of claim 1, wherein the utility vehicle includes at least one accessory that operates at the second voltage, wherein the VCM is constructed to control the at least one accessory, wherein the VCM is constructed to supply power at the second voltage to the at least one accessory, and wherein the VCM is constructed to supply at least one of a discrete output, an analog output and a data bus signal to control the at least one accessory.

6. The utility vehicle of claim 5, wherein the at least one accessory is a pair of headlights, wherein the VCM is constructed to control the pair of headlights to perform an alternating wig wag headlight operation.

7. The utility vehicle of claim 1, wherein the VCM is constructed to provide supervisory processing and/or implementation of multilevel fault management/storage enabling independent control of all vehicle subsystems and/or accessories, wherein the VCM is constructed to provide a fault vehicle response, the fault vehicle response including complete vehicle shutdown, vehicle top speed reduction and/or user information/warning, and wherein the VCM is constructed to provide the utility vehicle with one or more of a plurality of operating modes, the plurality of operating modes including at least one of a standby mode, an active mode, a charge mode, a tow mode, a stow mode and/or a low power mode.

8. The utility vehicle of claim 1, further comprising vehicle system data bus components and a network, wherein the vehicle system data bus components are coupled to the VCM via the network, wherein the VCM is constructed to authenticate the vehicle system data bus components via the network, and wherein the VCM is constructed to authenticate the vehicle system data bus components via the network using a seed-key algorithm.

9. The utility vehicle of claim 1, wherein the VCM is constructed to provide supervisory control and coordination of vehicle component software updates from at least one source, the vehicle component software updates including an update to at least one of a battery management system (BMS) of the batter pack, an electric motor control unit (MCU) of the electric motor, and a display control unit, the at least one source including at least one of a data bus connected wireless connectivity module, a data bus connected diagnostic tool, and a data bus connected computer.

10. The utility vehicle of claim 9, further comprising a wireless connectivity module constructed to provide wireless connectivity, wherein the VCM is constructed to provide supervisory control of vehicle top speed and allowable direction based upon commands received from the wireless connectivity module, wherein the VCM is constructed to provide control and data bus transmission of vehicle status display information, and wherein the VCM is constructed to provide control and data bus transmission of all vehicle status display information.

11. An apparatus comprising:
a utility vehicle having wheels for rolling transportation, the utility vehicle including:
an electric motor and electric motor control unit (MCU) structured to provide motive power to at least one of the wheels;
a battery pack coupled with a battery management system (BMS) structured to provide electric power at a first voltage through a main power output to the electric motor for motive transportation, the battery pack including an auxiliary power output structured to provide an output power at a second voltage lower than the first voltage; and
a vehicle control module (VCM) coupled to the auxiliary power output and constructed to communicate with the MCU and the BMS, the VCM structured to provide supervisory control of the utility vehicle.

12. The apparatus of claim 11, wherein the VCM communicates with the MCU and the BMS over a network connection, wherein the BMS includes an internal DC/DC step down converter used to provide power to the auxiliary power output, wherein the utility vehicle further includes a main DC/DC converter which is structured to be enabled by a signal from a second auxiliary power output from the BMS, and wherein operation of the main DC/DC converter is controlled by the VCM.

13. The apparatus of claim 12, which further includes a charger structured to provide power to the battery pack for charging, wherein the VCM communicates with the BMS and the MCU over a first communications bus, and wherein the VCM communicates with the charger over a second communications bus.

14. The apparatus of claim 13, wherein the VCM disables the main DC/DC converter when main power from the battery pack is commanded to an OFF condition, wherein the MCU includes a capacitor bank, wherein the BMS includes a third auxiliary power output structured to provide power at a voltage higher than the second voltage, wherein the capacitor bank of the MCU is structured to receive a pre-charge via power delivered from the third auxiliary power output, and wherein the VCM is structured to control delivery of power from the third auxiliary power output to the MCU.

15. The apparatus of claim 11, wherein the BMS further includes at least one battery contactor structured to regulate power provided from the battery pack through the main power output, wherein the MCU is structured to control a main contactor which is in serial electrical communication with the battery contactor when both the battery contactor and the main contactor are closed and the battery pack provides power through the main power output.

16. The apparatus of claim 15, wherein the VCM is structured to issue at least one command over a communication bus to actuate the main contactor and the battery contactor, and wherein the VCM is structured to initiate a weld check of contactors includes at least one of the main contactor and battery contactor.

17. The apparatus of claim 16, which further includes a main DC/DC converter in electrical communication with the BMS via a second auxiliary power output, wherein the VCM is structured to disable the main DC/DC converter via the second auxiliary power output during the weld check.

18. The apparatus of claim 11, wherein the MCU includes a capacitor bank and the battery pack includes a DC/DC converter, and wherein the VCM is structured to enable the DC/DC converter when main power at the main power output is OFF so that power can be dissipated from the capacitor bank.

19. The apparatus of claim 11, which further includes a wheel sensor structured to detect motion of at least one wheel of wheels, wherein the BMS further includes a second auxiliary power output structured to provide power to the MCU apart from a main power, wherein the VCM is structured to monitor the wheel sensor when main power through the main power output is OFF, wherein the battery pack includes a battery contactor structured to move between an open and closed state to regulate power through the main power output of the battery pack, which further includes a main contactor structured to receive power from the main power output and provide power to the MCU, and wherein the VCM is structured to close the battery contactor and main contactor if main power through the main power output is OFF and motion is detected by the wheel sensor.

20. The apparatus of claim 19, which further includes a third auxiliary power output structured to provide power at a third voltage that is higher than the second voltage and electrically connected to a display unit, and which further includes a fourth auxiliary power output structured to provide power at a fourth voltage that is higher than the second voltage and electrically connected to a main DC/DC converter, wherein the main DC/DC converter is further electrically connected to the main power output.

* * * * *

UNITED STATES PATENT AND TRADEMARK OFFICE
CERTIFICATE OF CORRECTION

PATENT NO. : 11,130,414 B2
APPLICATION NO. : 16/695937
DATED : September 28, 2021
INVENTOR(S) : Steele et al.

It is certified that error appears in the above-identified patent and that said Letters Patent is hereby corrected as shown below:

In the Claims

Column 14, Line 29, delete "controller".

Signed and Sealed this
Twentieth Day of December, 2022

Katherine Kelly Vidal
*Director of the United States Patent and Trademark Office*